April 15, 1969     G. HEIM     3,438,150
INSTALLATION FOR THE SEALING OF RELATIVELY
MOVABLE PARTS, ESPECIALLY OF SLIDING
WINDOWS IN MOTOR VEHICLES
Filed May 12, 1967

INVENTOR
GERHARD HEIM

BY Dicke & Craig
ATTORNEYS

United States Patent Office 3,438,150
Patented Apr. 15, 1969

3,438,150
INSTALLATION FOR THE SEALING OF RELATIVELY MOVABLE PARTS, ESPECIALLY OF SLIDING WINDOWS IN MOTOR VEHICLES
Gerhard Heim, Sindelfingen, Germany, assignor to Daimler-Benz Aktiengesellschaft, Stuttgart-Unterturkheim, Germany
Filed May 12, 1967, Ser. No. 638,137
Claims priority, application Germany, May 13, 1966, D 50,109
Int. Cl. E05d 15/16
U.S. Cl. 49—319      3 Claims

ABSTRACT OF THE DISCLOSURE

An installation for sealing relatively movable parts such as door parts, window parts, flap parts, lid or cover parts or other parts in vehicles, and in particular sliding windows in motor vehicles with respect to their sealing frame, in which a tubularly shaped sealing strip is arranged at least on one side of the part to be sealed whereby springs are arranged within the sealing strip normally seeking to expand the same into tight sealing abutment with the respective vehicle part, and the interior of the sealing strip is adapted to be connected with a vacuum source, when moving the respective vehicle part so as to annul, in effect, the spring force of the springs and cause a certain lifting off of the sealing strip to facilitate the relative movement.

Background of the invention

The present invention relates to an installation for sealing relatively movable door parts, window parts, shutter parts, cover parts or lid parts in vehicles, especially of sliding windows in motor vehicles with respect to their sealing frames with the aid of a tubularly-shaped sealing strip arranged at least on one side of the part to be sealed.

Tubularly-shaped sealing strips are known, per se, in the prior art. In that connection, it has already been proposed heretofore to inflate the tubularly-shaped sealing strips for the purpose of improved sealing effect, i.e., to place the same under pressure. The present invention is concerned with a different problem. More particularly, the opening or closing of the sliding window is, for the most part, troublesome and inconvenient, for example, for the driver or the passenger of a passenger motor vehicle because of the force requirement needed therefor. The lateral rotary movement with the hand to open or close the window is, by itself, already troublesome, and this is even more so the case with a windowpane which operates only with difficulties. The known prior art remedies by means of automatic external drives, such as electric motors or pneumatic actuating mechanisms, is expensive, increases the weight, and is prone to troubles and disturbances.

In particular, that frictional resistance has to be overcome during actuations which oppose the measures realized with more or less large technical expenditures for the sealing of the edges of windows or flaps against movement of the pane. These measures, in general, consist with windows in that the windowpane edges are guided on all sides with elastic abutment within the surrounding rubber or other strips against the penetration of water, dust or draft air. However, these strips are subjected to a high degree of wear and additionally are also neither resistant as regards climate nor resistant to aging.

Similar problems occur with the doors, flaps, or hinged parts. In connection therewith in the closing position, the edge is pressed against and over the sealing profile or section, and the latter is elastically deformed. The sealing profile or section is intended thereby to abut in a tight manner over the entire door or flap area against the rigid frame and against the door or the flap. Furthermore, with partially opened sliding doors and windows, the part thereof which is disposed in the guide means is intended to continue to seal the area covered thereby against the outside.

Summary of the invention

The present invention aims at a solution of the aforementioned problems. In particular, the actuation of sliding windows is to be facilitated thereby. The present invention solves these aims and underlying problems with the installations of the aforementioned type in that elastic or springy means are arranged within the sealing strip body which expand the same into tight abutment at the respective vehicle part and in that the sealing strip is connected with a line leading to a vacuum by way of a switching element to cause a lifting off during the movement of the respective vehicle part. In general, the suction intake manifold of the engine is used thereby as vacuum source. Naturally, the spring force is thereby smaller than the force to be exerted by the vacuum on the sealing strip. The type of spring means is completely within the scope of a person skilled in the art. However, it is also within the purview of the present invention if the sealing strip body itself serves as springy or elastic means, for example, in that it is formed somewhat stronger or thicker at the sides of the hose.

With a preferred embodiment according to the present invention, the switching element for an automatic engagement of the vacuum is operatively connected with the actuating or control member for the movement of the vehicle part to be sealed or is constituted by the same. It is thereby insignificant, in principle, whether the control is a direct or an indirect control. Naturally, auxiliary forces may be also interconnected within the scope of the present invention. Thus, with one embodiment according to the present invention, one electric switch each is coordinated to the actuating or control member for each direction of movement whose pulse, by way of a magnetic valve, connects the sealing strip upon actuation with the vacuum connection and with the atmosphere in the normal rest position.

The construction according to the present invention offers the advantage that the sealing force is now disengaged, so to speak of, during the actuation. Consequently, also the actuation itself can be undertaken with considerably smaller forces. In contradistinction thereto, a reduction of the sealing effect need not be feared because the tubularly-shaped sealing strip develops its full sealing effect with the aid of the spring means thereof also in case of failure or absence of the vacuum.

For the special case of a motor-vehicle sliding-window, the present invention proposes that the windowpane is guided at its edges on one side along a sliding strip and on the other side along the sealing strip body and that the sealing strip body extends along the upper and lateral window guide means and is connected at its two ends by way of lines with the switching element. Appropriately, the windowpane, weight-balanced by a spring-force, is connected at its lower edge by means of a lever with the pivotal actuating handle and this actuating handle possesses a certain movability on both sides thereof against the action of springs and is operatively connected by way of a lever with the switching element. Of course, in lieu of this lever an electrical actuation by way of a switch and/or relay may also take place within the scope of the present invention.

The construction of the sealing strip itself is at the will of a person skilled in the art. However, the present invention prefers a construction according to which the sealing strip has an approximately rectangular cross section and weak springs between the oppositely disposed surfaces whose one surface forms the sealing surface.

Accordingly, it is an object of the present invention to provide an installation for sealing relatively movable parts, and more particularly for sealing movable doors, windows, flaps or lids in vehicles which is simple in construction yet eliminates effectively the aforementioned shortcomings and drawbacks encountered with the prior art constructions.

It is another object of the present invention to provide a sealing installation, in particular for sliding windows in motor vehicles which greatly facilitates the opening and closing thereof.

Still a further object of the present invention resides in a sealing installation, in particular for sliding windows in motor vehicles which does not increase the weight thereof, does not entail the danger of breakdowns or failures as might occur with auxiliary force actuations, and is additionally relatively inexpensive.

Still another object of the present invention resides in a sealing installation for the doors, windows or any other relatively movable parts of a vehicle in which the sealing force necessary to assure a tight seal is eliminated, so to speak of, during displacement of the part.

A still further object of the present invention resides in a sealing arrangement of the aforementioned type which achieves the advantages described hereinabove by extremely inexpensive means without danger to jeopardizing the tight seal.

These and further objects, features, and advantages of the present invention will become more obvious from the following description when taken in connection with the accompanying drawing which shows, for purposes of illustration only, one embodiment in accordance with the present invention, and wherein.

Figure 1:
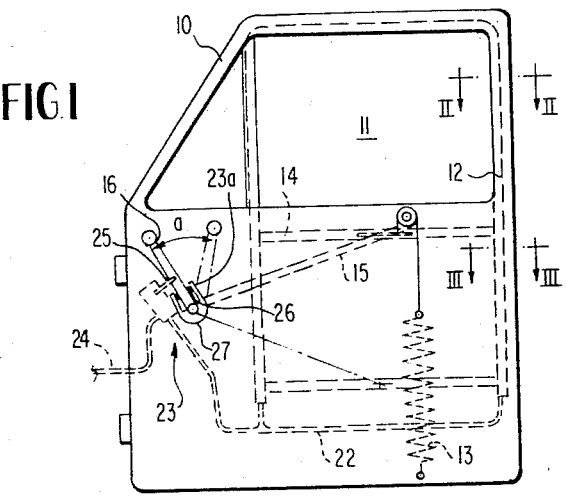
FIGURE 1 is a somewhat schematic side elevational view of a vehicle door provided with a seal means for the sliding window thereof in accordance with the present invention.

Referring now to the drawing, wherein like reference numerals are used throughout the various views to designate like parts, and more particularly to FIGURE 1, the rectangular frameless windowpane 11 is adapted to be displaced upwardly or downwardly within the guide frame 12 in a vehicle door 10. The weight of the pane 11 is compensated for by the spring 13 which engages at the lower support rail 14 of the pane 11. A lever 15 also engages with this rail 14 which, at its end, is supported in the door 10 and is operatively connected in any conventional manner with the actuating handle 16. By movement of the actuating handle 16 through the range $a$, the windowpane 11 can be displaced in a conventional manner in the downward direction, i.e., from a closed into an open position.

Figure 2:
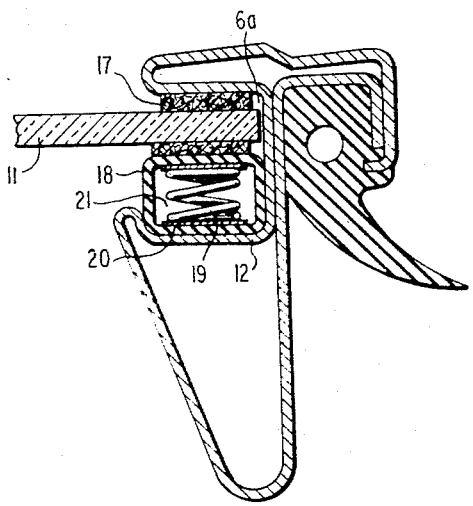
FIGURE 2 is a partial cross-sectional view, on an enlarged scale, taken along line II—II of FIGURE 1.
Figure 3:
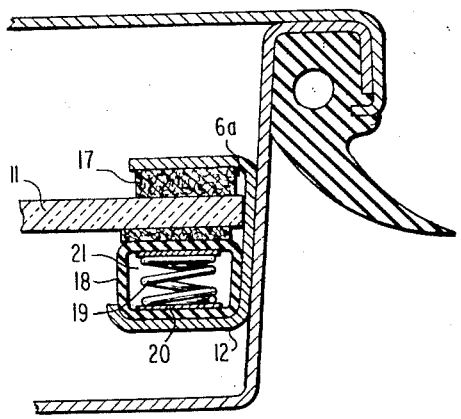
FIGURE 3 is a partial cross-sectional view, similar to FIGURE 2, taken along line III—III of FIGURE 1.

According to FIGURES 2 and 3, the guide means 12 have an approximately U-shaped cross section. The windowpane 11 abuts with its rims on one side against a sliding rail 17. A hose-shaped sealing strip 18 is arranged on the other side of the windowpane 11. The sealing strip body generally consists of rubber or other known suitable plastic material. It has a rectangular cross section whereby the somewhat longer sides of the rectangle form the sealing surface and support surface. An appropriate number of coil springs 19 are disposed on the inside of the sealing strip body 18 between the two last-mentioned surfaces. Small, possibly also elastic plates 20 or other base plates are arranged between the ends of the springs and the sealing strip body. The sealing strip body 18 is expanded by these springs 19 and possibly by the elastic base plates 20 and abuts over its entire sealing surface flush against the pane 11.

According to FIGURE 1, the tubular-shaped sealing strip body 18 is arranged at the top and on both sides of the pane 11. The interior 21 of the sealing strip body 18 is operatively connected at both ends thereof by way of lines 22 with a switching element generally designated by reference numeral 23. The switching element 23, in its turn, is operatively connected with a vacuum line 24. The switching element 23 is operatively connected by means of a small lever 25 with the actuating handle 16. The latter is operatively connected by means of small springs 26 with an approximately U-shaped bow-like element 27 and is rotatable by a slight amount with respect thereto after overcoming the force of the aforementioned small springs 26.

In the illustrated position of FIGURE 1, the springs 26 hold the actuating handle 16 in its center position. The switching element 23 thereby opens up the connection of the line 22—and therewith of the interior of the sealing strip body 18—with an outside connection (not illustrated) in communication with the atmosphere. As a result thereof, the springs 19 are able to correspondingly expand the sealing strip body 18 and are able to bring the seal into full effect. If the actuating handle 16 is now moved from the illustarted position into the one or other direction for opening or closing, then the small spring 26 disposed on the respective side yields and the switching element 23 is switched by means of the lever 25. The switching element 23 now connects the line 22 with the vacuum connection 24. The vacuum now prevails in the interior 21 of the sealing strip 18 and overcomes the force of the springs 19. As a result thereof, the force at the sealing surface is very considerably reduced. With a corresponding dimensioning and selection of the springs in relation to the vacuum, it is even possible to achieve a lifting off of the seal to a certain extent.

If after completed actuation, one releases again the actuating handle 16, then the latter is brought back again into its center position by the springs 26. In this center position of the actuating handle 16, the line 22 and therewith the sealing strip interior 21 is again connected with the atmosphere. The sealing strip now expands again and the full sealing effect is again reestablished.

I claim:

1. An installation for operating a sliding window in a motor vehicle, comprising pane means, guide means for said pane means, sealing strip body means extending along the upper and lateral guide means, elastic means associated with said sealing strip body means urging said means to expand into sealing abutment against said pane means, sliding strip means, said pane means being guided along the upper and lateral edges thereof on one side at said sliding strip means and on the opposite side at said sealing strip body means, and means including switching means operatively connecting both ends of said sealing strip means with a line leading to a vacuum source to effect at least a partial reduction of the sealing pressure caused by said elastic means during movement of the window, and further comprising control means for the movement of the window, including spring force means for balancing the weight of said pane means including lever means operatively connecting the lower end of said pane means with a pivotal actuating handle of said control means, said actuating handle having a certain mobility on both sides thereof against a spring force, and a lever operatively connecting said actuating handle with said switching means, wherein said sealing strip body means has an approximately rectangular cross section, said elastic means, in the form of weak coil springs, being arranged between the oppositely-disposed surfaces, one of which surfaces constitutes the sealing surface, wherein said switching means includes an electric switch coordinated to the control means for each direction of movement thereof, magnetic valve means, the pulses produced by said switch operatively connecting the sealing strip body means by way of said magnetic valve means with the vacuum connection upon actuation and with the atmosphere in the rest position thereof.

2. An installation for operating a sliding window in a motor vehicle, comprising pane means, guide means for said pane means, sealing strip body means extending along the upper and lateral guide means, elastic means associated with said sealing strip body means urging said means to expand into sealing abutment against said pane means, sliding strip means, said pane means being guided along the upper and lateral edges thereof on one side at said sliding strip means and on the opposite side at said sealing strip body means, and means including switching means operatively connecting both ends of said sealing strip means with a line leading to a vacuum source to effect at least a partial reduction of the sealing pressure caused by said elastic means during movement of the window, and further comprising control means for the movement of the window, including spring force means for balancing the weight of said pane means including lever means operatively connecting the lower end of said pane means with a pivotal actuating handle of said control means, said actuating handle having a certain mobility on both sides thereof against a spring force, and a lever operatively connecting said actuating handle with said switching means, wherein said sealing strip body means has an approximately rectangular cross section, said elastic means, in the form of weak coil springs, being arranged between the oppositely-disposed surfaces, one of which surfaces constitutes the sealing surface, further comprising means operatively connecting said switching means with said control means to provide automatic engagement of the vacuum.

3. An installation for operating a sliding window in a motor vehicle, comprising pane means, guide means for said pane means, sealing strip body means extending along the upper and lateral guide means, elastic means associated with said sealing strip body means urging said means to expand into sealing abutment against said pane means, sliding strip means, said pane means being guided along the upper and lateral edges thereof on one side at said sliding strip means and on the opposite side at said sealing strip body means, and means including switching means operatively connecting both ends of said sealing strip means with a line leading to a vacuum source to effect at least a partial reduction of the sealing pressure caused by said elastic means during movement of the window, and further comprising control means for the movement of the window, including spring force means for balancing the weight of said pane means including lever means operatively connecting the lower end of said pane means with a pivotal actuating handle of said control means, said actuating handle having a certain mobility on both sides thereof against a spring force, and a lever operatively connecting said actuating handle with said switching means, wherein said sealing strip body means has an approximately rectangular cross section, said elastic means, in the form of weak coil springs, being arranged between the oppositely-disposed surfaces, one of which surfaces constitutes the sealing surface, wherein said switching means is constituted by said control means to provide an automatic engagement of the vacuum.

References Cited

UNITED STATES PATENTS

| | | | |
|---|---|---|---|
| 2,003,614 | 6/1935 | Shetzline | 49—477 XR |
| 3,098,519 | 7/1963 | Myers et al. | 49—477 XR |
| 3,124,850 | 3/1964 | Johnson | 49—419 |

KENNETH DOWNEY, *Primary Examiner.*

U.S. Cl. X.R.

49—416, 477